United States Patent [19]

Sobey, Jr.

[11] Patent Number: 4,545,641

[45] Date of Patent: Oct. 8, 1985

[54] HIGH SPEED ERASING AND REBIASING OF THERMOPTIC THIN FILMS IN THE MEDIUM AND LONG-WAVE INFRARED

[75] Inventor: Arthur E. Sobey, Jr., Richardson, Tex.

[73] Assignee: LTV Aerospace and Defense, Dallas, Tex.

[21] Appl. No.: 493,338

[22] Filed: May 10, 1983

[51] Int. Cl.$^4$ .............................................. G02F 1/19
[52] U.S. Cl. .................................... 350/1.1; 350/363
[58] Field of Search ................ 350/359, 363, 353, 1.1, 350/1.6; 358/236, 237

[56] References Cited

U.S. PATENT DOCUMENTS

| | | | |
|---|---|---|---|
| Re. 28,515 | 8/1975 | Altman | 96/67 |
| 3,396,378 | 8/1968 | Keith, Jr. | 340/324 |
| 3,479,510 | 11/1969 | Baumberger et al. | 250/83.3 |
| 3,484,722 | 12/1969 | Barker, Jr. et al. | 332/4 |
| 3,497,286 | 2/1970 | Morton et al. | 350/160 |
| 3,516,185 | 6/1970 | Paine | 40/28 |
| 3,533,823 | 10/1970 | Newkirk et al. | 117/0.5 |
| 3,706,845 | 12/1972 | Heyman et al. | 350/353 |
| 3,789,421 | 1/1974 | Chivian et al. | 346/1 |
| 3,977,764 | 7/1976 | d'Auria et al. | 350/96 C |
| 4,040,047 | 8/1977 | Hareng et al. | 340/324 R |
| 4,236,156 | 11/1980 | Eden | 350/353 |
| 4,283,113 | 8/1981 | Eden | 350/353 |

*Primary Examiner*—Bruce Y. Arnold
*Attorney, Agent, or Firm*—J. M. Cate; S. S. Sadacca

[57] ABSTRACT

Apparatus for rapidly erasing and rebiasing a thermoptic thin film in the near and medium infrared. A thermal insulating material (56) is disposed adjacent a thermoptic vanadium oxide thin film (50). The insulating layer has high transmittance in the 3–5 or 8–12 micrometer spectral bands. A layer of resistive semiconductor material (54) having high transmittance in the 3–5 or 8–12 micrometer band is disposed between the layer of insulating material and the vanadium oxide thin film. A multilayer dielectric thin film stack is superposed adjacent the vanadium oxide thin film, or is disposed in two parts adjacent the upper and lower surfaces of the thermoptic thin film. The multilayer dielectric stack, in combination with the thermoptic film, the resistive layer and the insulating layer provides a low reflectance, high transmittance condition over the 3–5 or 8–12 micrometer band when the thermoptic film is in its semiconducting state and a high reflectance condition over the same band when the thermoptic film is in its metallic state. The resistive layer is connected to a current generator (18) which supplies a current to the resistive layer dissipating heat into the vanadium oxide thin film and into the insulating layer. A thermal body (24), having high thermal conductivity and interfacing with the insulating layer at the opposite boundary from the thermoptic thin film, contains a conduit (34) through which a refrigerated liquid (26) is flowed to establish a thermal gradient from the thermoptic thin film to the fluid.

13 Claims, 5 Drawing Figures

HIGH SPEED ERASING AND REBIASING OF THERMOPTIC THIN FILMS IN THE MEDIUM AND LONG-WAVE INFRARED

TECHNICAL FIELD

The invention pertains to thermoptic thin films generally and more particularly to erasure and rebiasing of thermoptic thin film structures for operation in the medium and long wave infrared spectral regions.

BACKGROUND ART

Thermoptic material exhibit changes in physical properties such as electrical conductivity, absorption, reflectivity and refractive index as the result of state changes between the semiconductor and metal states. Thermoptic materials, such as vanadium and titanium oxides, have relatively low infrared absorption in the semiconductor state and high absorption and high reflectance in the metal state.

Thermoptic materials which exhibit metal-semiconductor phase transitions have a reflectance which is temperature sensitive. In thin films of thermoptic materials, there is a transition temperature below which the film behaves as a semiconductor and above which it behaves as a metal. Above the transition temperature of the thin film, the reflectance of the thermoptic material increases abruptly. It is well known that images can be recorded in thin films of thermoptic material at extremely high speeds by selectively heating a region of the film with a laser or electron beam. As long as the ambient temperature of the film is maintained at a suitable bias temperature inside the hysteresis loop, these images will be stored in the film. Normally, such images are erased by allowing the entire film to cool from its bias temperature down to some temperature well below the hysteresis loop.

If the cooling of the film is allowed to occur by natural radiation, conduction or convection to its surroundings, the speed of erasure is slow and impractical for many applications of the thermoptic films. More direct means have also been employed for cooling these films, such as direct cooling with thermoelectric junctions, as disclosed in U.S. Pat. No. 4,283,113 to Eden. U.S. Pat. No. 4,236,156 to Eden discloses another method for erasing thermoptic film displays by generating a high frequency surface acoustic wave on a piezoelectric substrate on which a thermoptic film is employed. Another technique for erasing the film uses a short burst spray of liquid refrigerant to cool the film below its hysteresis loop in a few milliseconds. However, the prior art techniques for erasing the rebiasing thermoptic films are either not fast enough or are not practical in many applications. For example, in dynamic infrared scene simulation, where a laser or electron beam is used to write scene information on the thermoptic film used as an infrared modulator, cycling requirements may require writing and erasing a scene on an individual thermoptic film at speeds as high as about 9 milliseconds. Some prior art erasing techniques are fast enough to meet this speed requirement but require complex and expensive apparatus and are not suitable for use with electron beam writing which requires that the thermoptic film be in a hard vacuum as in a cathode ray tube (CRT). Therefore, a fast method and simple apparatus, suitable for use in a CRT, are needed for erasing and rebiasing thermoptic thin film modulators.

DISCLOSURE OF THE INVENTION

The specification discloses an apparatus for rapidly erasing and rebiasing a vanadium dioxide thin film modulator, adapted for modulating infrared light in the 3-5 or 8-12 micron bands.

According to one aspect of the present invention, heat is dissipated from a vanadium dioxide thin film across a layer of thermal insulator material in which is established a thermal gradient by flowing a refrigerated liquid adjacent the opposite side of the thermal insulator material. Heat is dissipated into the vanadium dioxide thin film and the thermal insulator material by inducing an electric current in a resistive layer disposed therebetween at a rate necessary to maintain the thermoptic thin film at a bias temperature. When the film is to be erased, the current is switched off, thereby allowing heat in the thermoptic film to dissipate and the temperature of the film to drop to an erase temperature below the hysteresis loop. A current may be selectively applied to return the temperature of the film to its bias temperature. The thermal insulating material may be chosen from a group comprising: germanium, gallium arsenide, zinc sulfate, zinc selenide, cadmium telluride, barium fluoride or strontium fluoride, which materials have high transmittance in the 3-5 and 8-12 micrometer spectral bands. The resistive layer is comprised of a semiconductor material having high transmittance in the 3-5 or 8-12 micrometer bands.

BRIEF DESCRIPTION OF THE DRAWINGS

A more complete understanding of the present invention can be had by reference to the following Detailed Description in conjunction with the accompanying Drawings, wherein.

DETAILED DESCRIPTION

Materials which exhibit marked changes in optical properties with changes in temperature are known as thermoptic materials. Compounds, such as certain ternary halides, ternary monochalcogenides and certain transition metal oxides, such as vanadium oxides and titanium oxides, exhibit these properties.

As the result of thermodynamic phase transitions from the semiconductor to metal states, certain vanadium oxides and titanium oxides undergo marked changes in physical properties such as reflectance, electrical conductivity and refractive index. In thin films of such materials, hysteresis effects are observed in the physical properties analogous to the ferromagnetic "memory" effects observed in certain ferromagnetic materials. These particular thermoptic materials have important applications in information displays and storage, as well as in the modulation of optical signals.

The thermoptic properties of these vanadium oxides and titanium oxides are usually exploited by making thin films of these materials containing large numbers of crystallites by conventional processes such as by a vacuum deposition. These thin films of thermoptic material normally are of vanadium dioxide ($VO_2$), but may also be of a titanium oxide ($Ti_4O_7$) or one of the other vanadium oxides, such as vanadium sesquioxide ($V_2O_3$) and vanadium oxide ($V_3O_5$).

These state transistions for vanadium dioxide thin films are thermodynamically reversible. When the temperature of the film in the reflecting or metal state is decreased, the film returns to its transparent or semiconductor state. Because the transition between successive states can be fairly rapid, even on the order of one-tenth microsecond or less, it is appropriate to speak of "switching" these films from one state to another.

Figure 1:
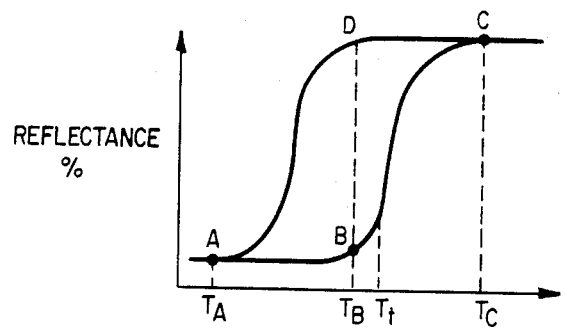
FIG. 1 is a graphical representation of the reflectance of thermoptic thin film as a function of temperature, illustrating the hysteresis effects and phase transition.

In applications such as modulation of light in infrared scene simulation, either the transmittance or reflectance of the modulator can be varied. However, in the present invention, reflectance is the physical property of primary interest. FIG. 1 graphically illustrates the reflectance of a thin film of vanadium dioxide, one member of this class of materials, as a function of temperature. Although all members of the class exhibit similar optical properties at different transition temperatures, vanadium dioxide is the most practical in most applications because its transition temperature is approximately 65° C. Other thermoptic materials, which have relatively high or low transition temperatures, are practical only in special applications, such as, for example, in high and low temperature environments.

Referring to FIG. 1, point A on the curve represents the reflectance of a thin film of vanadium dioxide which is initially at a temperature well below the transition temperature, $T_t$ of the film. If the film is heated by application of thermal energy to some temperature $T_B$, the reflectance of the film will gradually increase to a point B on the curve. As the temperature exceeds the transition $T_t$, which for vanadium oxide thin films is approximately 65° C., the reflectance will rapidly increase as the film is switched to its metal state. When the transition temperature of the film is exceeded by some temperature $T_C$, the film will have relatively high reflectance, as indicated by the point C on the curve. When the temperature of the film is lowered, such as by ordinary radiative or conductive cooling following heating, the film will exhibit a reflectance such as shown by the upper portion of the loop in FIG. 1. As the film is cooled from temperature $T_C$ back to the temperature $T_B$, the material retains its relatively high reflectance as shown by point D on the upper portion of the reflectance curve. The film is thus bistable for certain temperatures within the hysteresis loop, having two markedly different values of reflectance depending upon the thermal history of the material. This property permits storage of information on the film, in the form of stored reflectance contrast, by thermally biasing the film at a temperature such as $T_B$ and writing the information on the film by locally heating the film through a heating cycle such as just described. To reduce the reflectance of the film back to that of the surrounding area, the temperature of the region must be lowered to some point below the hysteresis loop, such as to erase temperature $T_A$, which corresponds to a point A of lower reflectance on the curve. Once the erase temperature $T_A$ is reached, the film may then be rebiased by reheating the film to the bias temperature $T_B$, where the film will again exhibit a reflectance shown by point B on the curve.

The present invention provides a method and apparatus for erasing and reestablishing the bias temperature, $T_B$ of a thermoptic reflectance modulator which is particularly useful in an infrared scene simulator. In such applications, a stored scene can be created on a vanadium dioxide modulator by scanning a visible laser beam or an electron beam, modulated with a source of scan data in a two dimensional scan pattern across the $VO_2$ thin film, while the film is thermally biased in its hysteresis loop. The scene is projected onto a sensor by placing the modulator between an infrared source and a system of projecting optics. To change the scene, the modulator is cooled below the hysteresis loop and reheated (rebiased) to the bias temperature. New scene data is then written into the modulator by the laser or electron beam. Dynamic scene projection is accomplished by using this erase/rebias system together with an optical framing switch to yield a flicker free output. A simulator running at 100 Hertz framing rate and utilizing two $VO_2$ modulators is fully cycled every 20 milliseconds. Each modulator is maintained at bias temperature for 16 milliseconds (7 milliseconds for writing on the film, 9 milliseconds for projection and 2 milliseconds for switching screens). This leaves 2 milliseconds for the erase and rebias functions for each modulator. Dynamic checks for rebias temperature and reflectivity, if needed, should be made during this time period. The available time can be divided as needed between the erase and rebias functions.

In the present invention, the heat flux input from a resistive heater layer placed in close proximity to the $VO_2$ thin film is balanced against a cooling heat flux through a thermal insulator to a high power dissipation heat sink. The $VO_2$ thin film is maintained at its bias temperature, nominally within the range 58° to 68° C. by the balanced heat fluxes. When the input heat flux from the resistive heater layer is interrupted by switching off the current to the resistive heater layer, the $VO_2$ thin film is rapidly cooled below its hysteresis loop as the result of a thermal gradient across the insulator. After erasure, the film is rebiased by repowering the heater layer.

Figure 2:
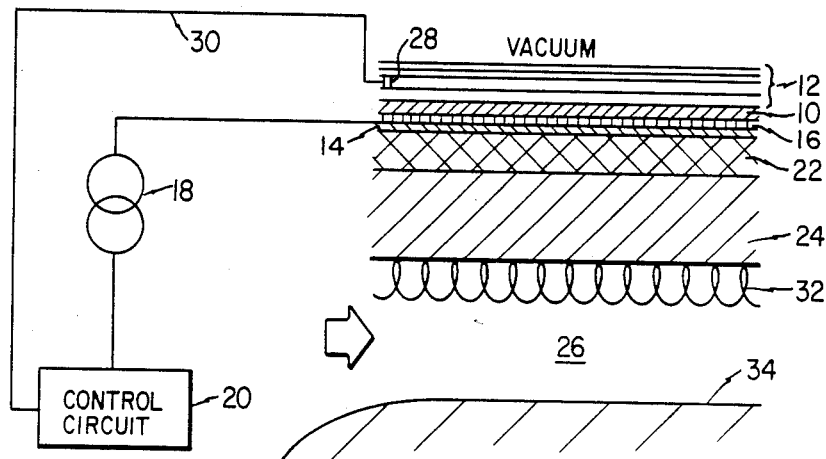
FIG. 2 illustrates a vanadium dioxide modulator and the erasing/rebiasing apparatus in cross section.

FIG. 2 illustrates a $VO_2$ thin film disposed on an erase/rebias apparatus, adapted to erase and rebias the $VO_2$ thin film at high speeds. The $VO_2$ thin film 10, which is preferably, but not necessarily maintained in a vacuum, is overlaid with a multilayer dielectric thin film stack 12, individual layers having thicknesses and optical characteristics chosen to obtain particular reflective/nonreflective characteristics for the particular spectral band of interest. A thin metal layer 14 is disposed beneath the $VO_2$ thin film 10 with a thin layer of electrical insulator material 16 sandwiched between the thin film 10 and the metal layer 14 to prevent current flow into the film. A current generator 18 is activated and controlled by a control circuit 20. Generator 18 supplies a variable current to layer 14 in which heat is generated by Joule heating.

The other side of metal layer 14 is bounded on the opposite side by an isotropic thermal insulator layer 22. Thermal layer 22 is retained on a metal support plate 24, the opposite interface of which is in contact with a flowing refrigerated liquid 26. Alternatively, the opposite interface may be in contact with a heat pumping device that employs thermoelectric (Peltier) cooling elements.

When the VO$_2$ film 10 is to be held at its bias temperature T$_B$ (FIG. 1), a large current is continuously passed through the metal layer 14. The Joule heat generated in this film is carried away by the large temperature difference between the metal layer 14 and the coolant flowing through the metal support plate 24. As long as the current flows, the VO$_2$ film 10 will be maintained at essentially the same temperature as the metallic layer, nominally 65° C., which is the bias temperature of the VO$_2$ film. Any temperature gradient in the multilayer film stack will be insignificant in a vacuum environment. Thus, the primary thermal gradient will be established through the thermal insulator layer whose thicknesses and thermal conductivity are chosen for a desired heat flow per unit area.

The bias temperature is thus maintained in the film 10 by a balance between the heat production in the metal layer 14 and the heat loss in the direction of the coolant. Erasure occurs by interrupting the current flow to the metal layer. The surface, including the metal film, VO$_2$ film and multilayer stack, is then cooled due to the large temperature differential between the thin film and the coolant, causing continuous flow of heat to the coolant. When the VO$_2$ thin film is cooled to an erase temperature, such as T$_A$ (FIG. 1), well below the hysteresis loop, the current is again turned on and the film is reheated to the bias temperature T$_B$. The film at this point then has a background reflectance B, as shown in FIG. 1, and is rebiased for writing.

The current waveform used during the rebias procedure can be tailored to establish rapid rebiasing with limited overshoot. Slight temperature drifts can be quickly compensated by providing a small temperature detector 28 in the dielectric film stack connected to a feedback loop 30 to the control circuit 20. Detector 28 can be used to determine when the erase is complete, to maintain accurate control of the rebias temperature and to check gray scale writing. Unlike other rebias methods, bias corrections can be applied while the film is being written on or projected. Alternatively, detector 28 can be an optical sensor positioned some distance from the film stack, adapted to measure changes in reflectance indicative of temperature changes.

A variety of materials may be used for the thermal insulator layer 22, the metal support plate 24 and the refrigerated liquid 26 to achieve the desired heat flux. Quartz (fused silica) is an exemplary choice for the thermal insulator layer because of its low thermal conductivity. Copper works well for the support plate because of its high thermal conductivity and strength and methanol is a suitable choice of coolant for many applications. It will be understood, of course, that other choices of materials may be appropriate, depending upon the desired flow rate. The cooling heat flux can be further increased by creation of a turbulent flow along metal support plate 24 by bonding a mesh 32 to the base metal or by other methods of creating turbulent flow in the cooling channel 34, in order to enhance the rate of heat transfer into the refrigerated liquid.

The rapid erase and rebias capabilities required for application of a thermoptic reflectance modulator in a dynamic scene simulator or display are satisfied by the transient thermal behavior of the structure shown in FIG. 2. There are also optical requirements for this type of application. They are that the reflectance modulator have a high reflectance where written on by the laser or electron beam (i.e., be partially or fully switched to the metallic state) and a low reflectance in the unwritten (unswitched) areas. When radiant energy from the illumination source is reflected off the modulator through projection optics into the test sensor, the written areas will appear as bright or high temperature objects and the unwritten areas as dark or low temperature objects in the scene.

With appropriate optical design, the structure shown in FIG. 2 has particular utility for the dynamic scene simulation or display application in the near infrared or visible spectral regions. The modulator surface structure, comprised of the VO$_2$ film 10, the thin metal layer 14, the electrical insulator layer 16 and the multilayer film stack 12, will be at or very near the thermal bias temperature, as will the upper surface of the thermal insulator layer. In order to obtain the required low reflectance with the VO$_2$ in the semiconductor (unswitched) state, this structure itself would be designed to be highly absorptive, since the metal film would have a low transmittance. If the structure is highly absorptive, it will also radiate energy like a blackbody at or near the bias temperature. In the near infrared or visible spectral regions, this radiant exitance would be negligible compared to the reflected energy from the illuminating source due to the low residual reflectance of the structure (one must assume a residual reflectance on the order of a fraction of a percent because it is not practical to achieve true null reflectance over a broad spectral region). However, in the intermediate and far infrared spectral bands, the radiant exitance of the surface structure would not be negligible compared to the residual reflected energy, and it would place a lower bound on the apparent temperature of simulated objects in the scene. The suggested use of quartz for the thermal insulator layer could also contribute to this emissivity since it is highly absorptive in these IR bands.

Many simulation applications, particularly infrared guidance and imaging systems, involve wavelengths in the 3-5 micrometer (intermediate) and 8-12 micrometer (far) infrared spectral bands. It is therefore desirable to modify the design of the apparatus of FIG. 2 to assure that the radiant exitance of the modulator is below that of a blackbody at the lowest temperature to be simulated in the scene. Normally, in simulated operational scenarios, the range of object temperatures in the scene would extend well below the thermal bias temperature (60°-65° C.) to near 0° C. or ever lower. Thus, an optical design is dictated for these spectral regions that not only have low reflectance in the unwritten areas of the modulator, but also have high transmittance through the modulator to the interface between the thermal isolator material and the heat sink. This interface must then be an excellent IR absorber and its temperature must be near or below the lowest temperature object to be simulated in the scene.

Figure 3:
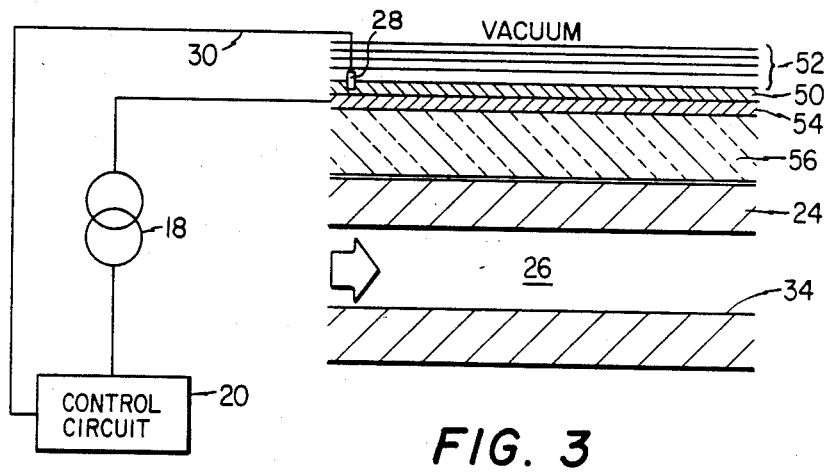
FIG. 3 illustrates a vanadium dioxide modulator adapted for applications in the 3-5 or 8-12 micrometer spectral bands.

FIG. 3 illustrates a modified erase/rebias structure designed to replace the structure shown in FIG. 2 for applications in the 3-5 micrometer or 8-12 micrometer spectral bands. A VO$_2$ thin film 50 is overlaid with a multilayer dielectric film stack 52. Alternatively, the VO$_2$ thin film may be embedded in the multilayer stack, with some layers above and some below it.

A thin layer of semiconductive material 54, capable of transmitting infrared energy at the desired wavelength, is disposed directly beneath or in very close proximity to the vanadium dioxide thin film 50. For example, one or more layers of the multilayer film stack 52 may be interposed between VO₂ film 50 and the semiconductive material layer 54. Sheet resistance layer 54 is formed of semiconductor material, such as germanium, silicon or gallium arsenide, which is doped with impurities to obtain a suitable resistivity to meet electrical design criteria. The thicknesses, optical characteristics and order of the individual layers in the multilayer film stack 52 are selected in combination with the thickness of the VO₂ film and the thickness of the selected sheet resistance layer material to obtain a low reflectance, high transmittance condition over the spectral band of interest when the VO₂ is in the semiconductor (unwritten or unswitched) state and a high reflectance condition over the same spectral band when the VO₂ is in the metallic (switched state). Alternatively, the design of the multilayer dielectric film stack may provide the opposite set of conditions between VO₂ states, i.e., a low reflectance, high transmittance condition when the VO₂ is in its metallic state and a high reflectance condition when the VO₂ is in its semiconductor state. The former design is normally preferred but in some applications the latter design may be preferred.

The thermal gradient (insulator) layer 56 must be selected from materials which transmit well in the 3–5 or 8–12 micrometer bands. To obtain the fastest response time in transient cooling for the least amount of power expended in maintaining the bias temperature at the surface, the thermal properties of the insulator are a primary design consideration. It has been analytically determined that a good figure of merit to use in selecting the insulator material is the ratio of its thermal conductivity to the square root of its thermal diffusivity. Candidate materials for the 8–12 micrometer spectral band include germanium, gallium arsenide, zinc sulfide, zinc selenide, cadmium telluride and possibly barium fluoride or strontium fluoride. Candidates for the 3–5 micrometer band include the candidates for the 8–12 micrometer band, as well as aluminum oxide ($Al_2O_3$), magnesium fluoride and lithium fluoride. Cadmium telluride probably offers the best overall performance. For shorter wavelength operation, in the 2–3 micrometer range, fused quartz (silicon oxide) offers a factor of two better figure of merit than cadmium telluride.

Of course, the figure of merit of the insulator material is not the only design criterion to be observed in selecting materials for a particular application. Other criteria include specific overall optical properties in the spectral band of interest, chemical compatibility with the process for fabrication of VO₂ films, compatibility with mechanical and thermal elastic properties of the other materials in the structure and the capability of the entire structure to withstand repeated transient thermal cycling. These considerations can be traded against power consumption or response time.

The thickness of the multilayer optical stack containing the VO₂ film, shown as the top layer in FIG. 3, will be of the order of a few microns. The sheet resistance layer 54 will be of the same order of thickness, assuming a material like germanium doped to a resistivity of the order 0.02 to 0.05 ohm-centimeters. The insulator layer 56 is at least 0.01 inches thicker (a minimum practical thickness). Therefore, the thermal mass of the multilayer optical stack and sheet resistance layer combined will be at most 5–10% of that of the normal thermal insulator layer. Furthermore, the upper surface of the structure will face a hard vacuum (the interior of the CRT) so the only mechanism for heat loss is radiation.

In both the unwritten and written states, the stack is designed to have low emissivity, so that radiation loss from the surface will be small. Upon interruption of the electrical current through the sheet resistance layer 54, the thermal insulator layer 56 therefore can be treated as an isotropic solid bounded by two parallel planes (a slab), insulated from heat loss at one plane and held at constant temperature (the heat sink surface temperature) at the other plane. This one-dimensional model is justified because in most applications, the lateral dimensions of the modulator will be much greater than the insulator layer thickness and the small thermal mass of the stack on top of the insulator layer can be neglected without significant error. For this model, the temperature at any point of the solid is given by $$T(t,x) = T_c + \qquad (1)$$

$$\frac{2}{l} \sum_{n=0}^{\infty} e^{-\kappa(2n+1)^2\pi^2 t/4l^2} \cos\left(\frac{2n+1}{2l}\right)\pi x \left\{ \frac{2l(-1)^{n+1} T_c}{(2n+1)\pi} + \int_0^l f(x')\cos\frac{(2n+1)\pi x'}{2l} dx' \right\}$$

where
  $\kappa$ = the thermal diffusivity of the slab material
  $T_c$ = the constant temperature at back side of the slab (x=l)
  l = the slab thickness
  x = the distance into slab from front surface (x=o)
  t = time
  f(x) = the initial temperature distribution in the slab For the case in which we start from a steady state condition with $T(o,o) = T_B$ (the bias temperature of the VO₂ layer)

$$f(x) = T_B - \frac{Q}{k}\kappa \qquad (2)$$

where
  Q = the heat flux through the slab
  k = the thermal conductivity of slab material The last term in the bracket in (1) becomes $$\int_0^l \left[T_B - \frac{Q}{k} x'\right] \cos\frac{(2n+1)\pi x'}{2l} dx' = \qquad (3)$$

$$\frac{2l}{(2n+1)\pi}\left\{ T_B \sin\frac{(2n+1)\pi x'}{2l} - \frac{Q}{k}\left[ x' \sin\frac{(2n+1)\pi x'}{2l} + \frac{2l}{(2n+1)\pi}\cos\frac{(2n+1)\pi}{2l} x' \right] \right\}_0^l =$$

$$\frac{2l}{(2n+1)\pi}\left[ (-1)^n T_B + \frac{2l}{(2n+1)\pi}\frac{Q}{k} - \frac{lQ}{k}(-1)^n \right]$$

Substituting in (1), $$T(t,x) = T_c + \qquad (4)$$

$$\frac{2}{l} \sum_{n=o}^{\infty} e^{-\kappa(2n-1)2\pi 2t/4l^2} \cos \frac{(2n+1)\pi x}{2l} \left\{ \frac{2l(-1)^{n+1}T_c}{(2n+1)\pi} + \right.$$

$$\left. \frac{2l}{(2n+1)\pi} \left[ (-1)^n T_B + \frac{2l}{(2n+1)\pi} \frac{Q}{k} - \frac{lQ}{k} (-1)^n \right] \right\}$$

$$= T_c +$$

$$\frac{2}{l} \sum_{n=o}^{\infty} e^{-\kappa(2n+1)2\pi 2t/4l^2} \cos \frac{(2n+1)\pi x}{2l} \left\{ \frac{2l}{(2n+1)\pi} \left( T_B - \right. \right.$$

$$\left. \left. T_c - \frac{lQ}{K} \right) (-1)^n + \frac{Q}{k} \left| \frac{2l}{(2n+1)\pi} \right|^2 \right\}$$

From (2)

$$f(l) = T_C = T_B - \frac{Q}{k} l \quad (5)$$

or $$\frac{Q}{k} l = T_B - T_C \quad (6)$$

Substituting in (4), the first term in the bracket becomes zero and $$T(t,x) = T_c + \frac{8Ql}{\pi^2 k} \sum_{n=o}^{\infty} \frac{e^{-\kappa(2n+1)2\pi 2t/4l^2}}{(2n+1)^2} \frac{\cos(2n+1)\pi x}{2l} \quad (7)$$

$$= T_c + \frac{8}{\pi^2} (T_B - T_c) \sum_{n=o}^{\infty} \frac{e^{-\kappa(2n+1)2\pi 2t/4l^2}}{(2n+1)^2} \cos \frac{(2n+1)x}{2l}$$

Consider the behavior of the surface temperature T(t,o) versus time. Making the assumption that the VO₂ film stack and the sheet resistance layer are of negligible thermal mass, this surface temperature is equal to the VO₂ film temperature. Evaluating (7) at x=o, $$T(t,o) = T_c + \frac{8}{\pi^2} (T_B - T_c) \sum_{n=o}^{\infty} \frac{e^{-\kappa(2n+1)2\pi 2t/4l^2}}{(2n+1)^2} \quad (8)$$

Let $$\tau = \frac{4l^2}{\pi^2 \kappa} \quad (9)$$

Then $$T(t,o) = T_c + \frac{8}{\pi^2} (T_B - T_c) \sum_{n=o}^{\infty} \frac{e^{-(2n+1)2t/\tau}}{(2n+1)^2} \quad (10)$$

$$= T_c + \frac{8}{\pi^2} (T_B - T_c) \left[ e^{-t/\tau} + \frac{e^{-9t/\tau}}{9} + \frac{e^{-25t/\tau}}{25} + \right.$$

$$\left. \frac{e^{-49t/\tau}}{49} + \ldots \right]$$

The reduction in surface temperature is $$\Delta T(t,o) = T_B - T(t,o) = (T_B - T_c) - \quad (11)$$

$$\frac{8}{\pi^2} (T_B - T_c) \sum_{n=o}^{\infty} \frac{e^{-(2n+1)2t/\tau}}{(2n+1)^2} =$$

$$(T_B - T_c) \left[ 1 - \frac{8}{\pi^2} \sum_{n=o}^{\infty} \frac{e^{-(2n+1)2t/\tau}}{(2n+1)^2} \right]$$

The quantity $\tau$ can be viewed as a thermal time contant of the system and t/$\tau$ as a normalized time. A parametric plot is shown in the lower part of FIG. 4 of the temperature difference across the slab versus the normalized time, with reduction in surface temperature ΔT as a parameter. The range of values chosen for ΔT covers all values expected to be required to accomplish erasure of stored patterns in a VO₂ film. The upper portion of FIG. 4 is a plot of the thermal time constant $\tau$ versus normalized time for values of time in which it might be desired to achieve a given ΔT for some application.

Figure 4:
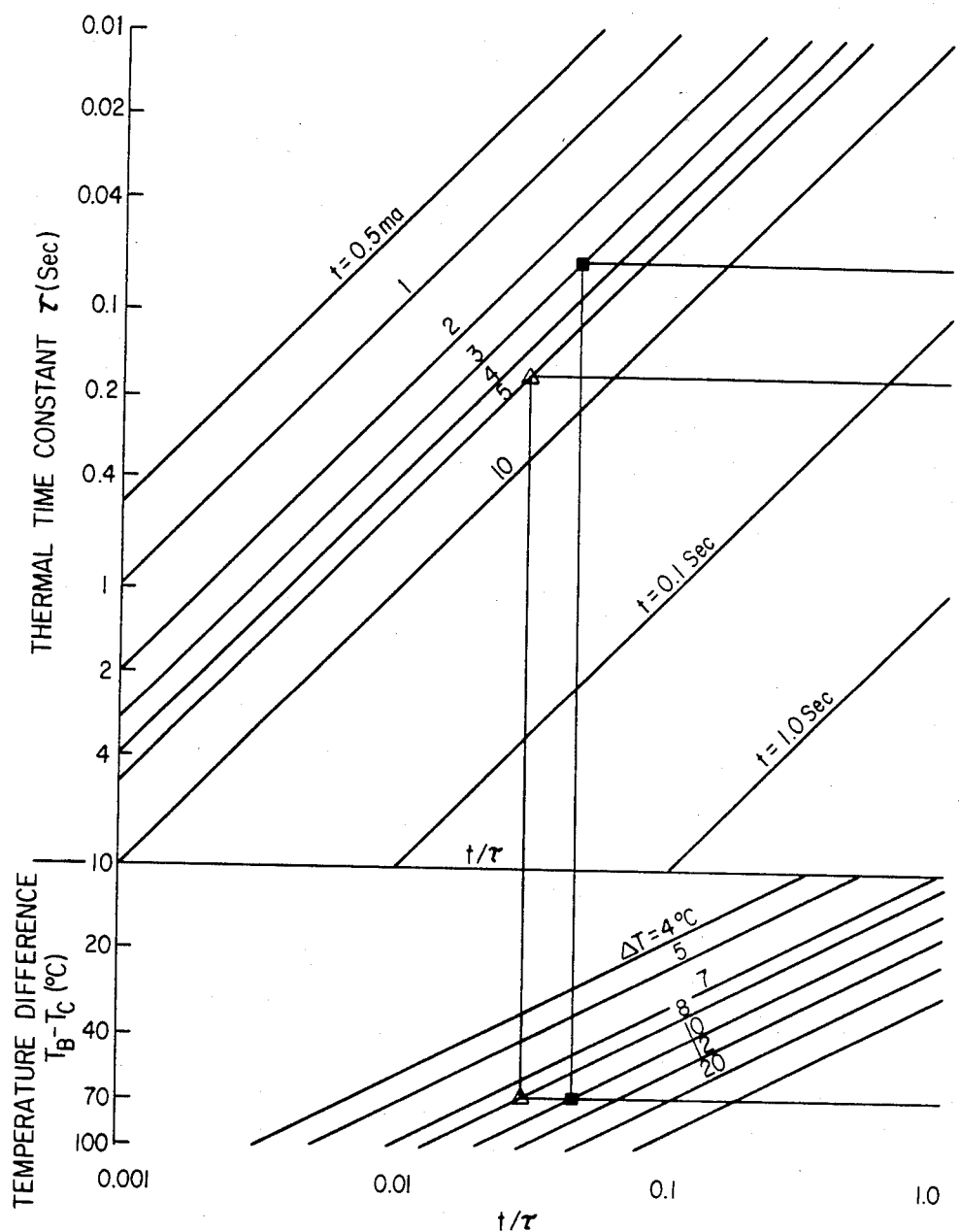
FIG. 4 is a graphical representation of the thermal time constant versus normalized time for selected values of time and of the temperature difference across the insulator layer for various values of surface temperature reduction.

It is apparent in FIG. 4 that the temperature difference across the slab is approximately related to the normalized time by a power law for all ΔT in the range calculated. The equation $$T_B - T_c = \alpha(\Delta T)(t/\tau)^{-\beta} \quad (0.0001 \leq t/\tau \leq 0.800) \quad (12)$$

fits the calculated data within one percent for $\alpha=1.392$ and $\beta=0.5$ for the range of values shown for t/$\tau$. As t/$\tau$ increases above 0.8, the curve for each ΔT value should depart from a straight line on the plot in FIG. 4 and asymptotically approach a value of $T_B - T_c = \Delta T$. Possibly equation (12) would have been arrived at directly if a power series solution had been assumed in solving the differential equation instead of the damped cosine series that was used.

Substituting (6) and (9) into (12), $$Q = 0.886 \frac{k\Delta T}{\sqrt{\kappa t}} \quad (13)$$

which implies that for any design choice of ΔT and t, the heat flux Q is dependent only on the thermal properties of the insulator slab material. Since it would be desirable to keep Q as small as possible, a material should be sought with the smallest value of $k/\sqrt{\kappa}$. Using $k/\sqrt{\kappa}$ as a Figure-of-Merit, CdTe is the best of the materials listed above for use in either of these spectral bands. The next best materials are ZnS and ZnSe. ZnSe would be the better choice if good VO₂ films can be deposited on it because it transmits will to 14 μm whereas ZnS starts cutting off at 10 μm. Assuming good films can be made on a material, additional questions about its suitability include its thermal expansion coefficient, compatibility with other materials in the faceplate structure, its mechanical strength, its ability to withstand thermal cycling and the adhesion of other required stack materials to it.

Figure 5:
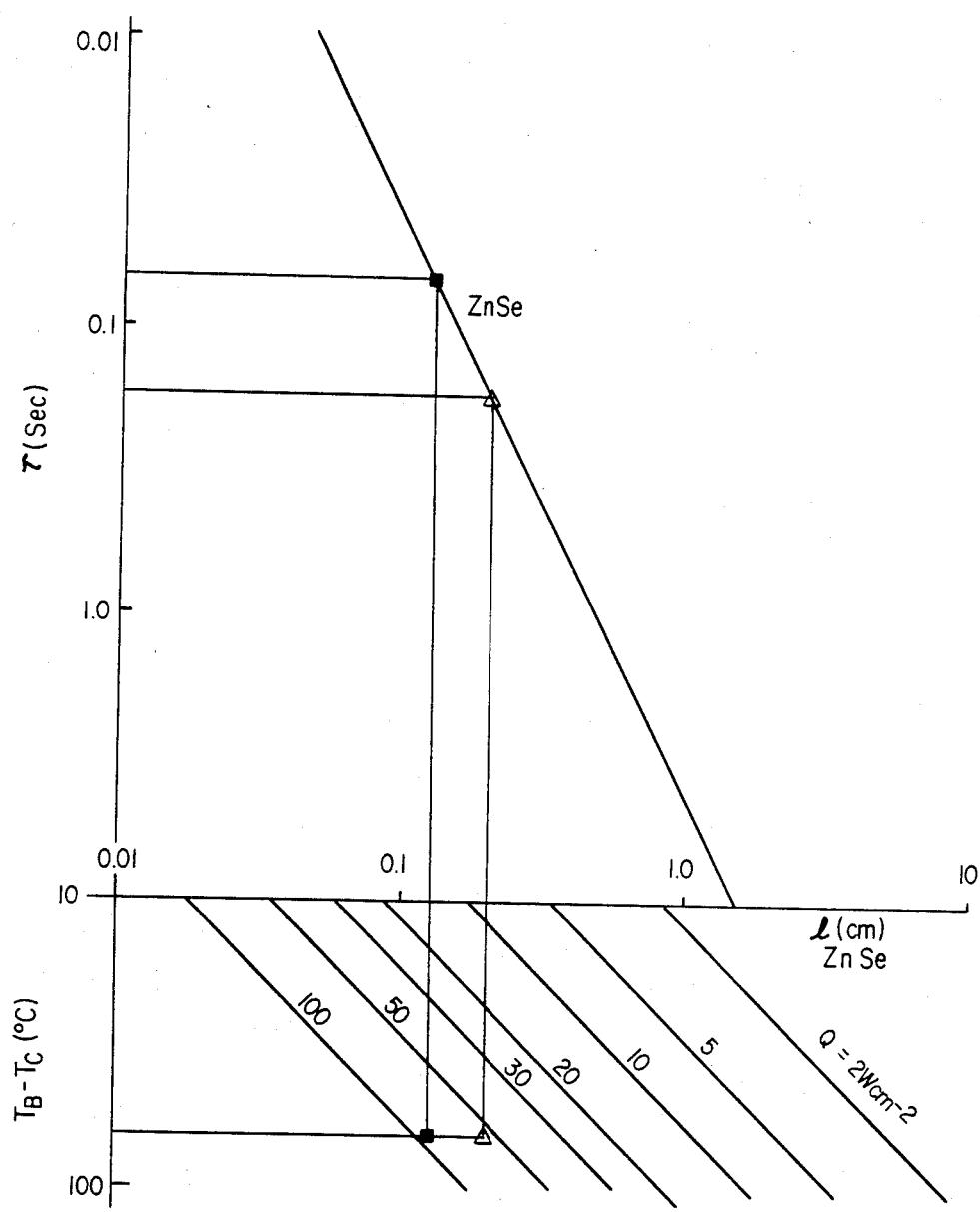
FIG. 5 is a graphical representation of the thermal time constant versus insulator layer thickness and of the temperature difference across the insulator layer versus layer thickness for various heat fluxes.

Assuming ZnSe will turn out to be a good choice in meeting all these requirements, FIG. 5 (lower graph) shows the design trades between temperature difference across the slab and slab thickness for various heat fluxes through the slab. The upper graph in FIG. 5 shows the thermal time constant for a ZnSe slab as a function of slab thickness.

As a design example, assume a ΔT of 10° C. is required to erase a stored pattern on the VO$_2$ film and that we desire to accomplish this erase in 3 ms. Also assume that we can conveniently establish a 65° C. temperature difference across the slab; i.e., operate the heat sink at about 0° C. Entering the lower graph of FIG. 4 on the y-axis at 65° C., draw a horizontal line to its intersection with the ΔT=10° C. line. This gives a value of $t/\tau = 0.046$. Drawing a vertical line to its intersection with the line for t=3 ms, $\tau = 0.065$. Now entering the upper graph of FIG. 5 on the y-axis at $\tau = 0.065$ and drawing a horizontal line to its intersection with the line for ZnSe, l=0.127 cm. Dropping a vertical line to its intersection with the horizontal line for $T_B - T_C = 65°$ C. in the lower graph, we find a value for Q just under 100 Wcm$^{-2}$. Black squares have been plotted in FIGS. 4 and 5 to illustrate this example. As another example, if we can accomplish the erase with a ΔT=8° C. and use the same value for $T_B - T_C$, and if we can accept an erase time of 5 ms, the heat flux value Q is approximately 60 Wcm$^{-2}$. For this example, the appropriate points in FIGS. 4 and 5 are plotted as an open triangle. The actual calculated values for Q for these two cases are, from equation (13), 92.1 Wcm$^{-2}$ and 56.4 Wcm$^{-2}$, respectively.

The lower surface of an insulator thermal gradient (insulator) 56 may be made a good IR absorber by coating it with an optically tuned stack of dielectric layers designed to have high absorptance over the band of interest, an IR absorbing paint or by using an agent for bonding to the heat sink that has high absorptance. A thin layer of a selected metal, either singly or in combination with layers of selected dielectric materials, also may produce the desired result.

Although preferred embodiments of the invention have been illustrated in the accompanying drawings and described in the foregoing detailed description, it will be understood that the invention is not limited to the embodiment disclosed, but is capable of numerous rearrangements, modifications, and substitution of parts and elements without departing from the spirit of the invention.

I claim:

1. In an optical modulator apparatus for erasing and rebiasing a thermoptic thin film adapted for modulating infrared light in a predetermined infrared spectral band by affecting a transition between a metallic state and a semiconductor state, the improvement being a plurality of thin layers cooperating to enhance said erasing and rebiasing cycle while maintaining an optical geometry effective to obtain a radiant exitance of said modulator corresponding to a blackbody at a lowest temperature expected to be simulated for modulation, said plurality of thin layers comprising:
  a layer of thermal insulating material having a high optical transmittance over said predetermined infrared spectral band and disposed beneath said thermoptic thin film,
  a layer of semiconductor resistive material disposed between said thermoptic thin film and said thermal insulating layer and having a high optical transmittance over said predetermined infrared spectral band and a resistivity effective to produce Joule heating at a selected rate, and
  a plurality of dielectric films adjacent said thermoptic film having composite thickness and optical characteristics in series with said
  thermoptic film, said layer of thermal insulating material, and said layer of semiconductor resistive material cooperating to obtain an optical shift from reflectance to transmittance conditions for incident radiation in said predetermined spectral band when said thermoptic layer transitions between said metallic state and said semiconductor state, respectively.

2. The improved apparatus according to claim 1, wherein said predetermined infrared spectral band has wavelengths of 3-5 micrometers.

3. The improved apparatus according to claim 2, wherein said thermal insulating material is selected from the group consisting of germanium, gallium arsenide, zinc sulfide, zinc selenide, cadmium telluride, barium fluoride, strontium fluoride, aluminum oxide, magnesium fluoride, and lithium fluoride.

4. The improved apparatus according to claim 1, wherein said predetermined infrared spectral band has wavelengths of 8-12 micrometers.

5. The improved apparatus according to claim 4, wherein said thermal insulating material is selected from the group consisting of germanium, gallium arsenide, zinc sulfide, zinc selenide, cadmium telluride, barium fluoride, and strontium fluoride.

6. The improved apparatus according to claim 1, wherein said layer of semiconductor resistive material is doped with impurities.

7. The improved apparatus according to claim 6, wherein said semiconductor resistive material is selected from the group consisting of germanium, silicon, or gallium arsenide.

8. The improved apparatus according to claim 1, wherein said layer of thermal insulating material has a lower boundary coated with an infrared absorbing paint.

9. The improved apparatus according to claim 1, further including:
  a lower boundary of said layer of thermal insulating material,
  heat extraction means adjacent said lower boundary, and
  a high IR absorptance bonding agent bonding said heat extraction means to said lower boundary.

10. The improved apparatus to claim 1, further including a plurality of dielectric layers disposed beneath said layer of thermal insulating material and optically tuned to substantially absorb said infrared light in said predetermined spectral band.

11. The improved apparatus according to claim 1, further including a layer of metal disposed beneath said layer of thermal insulating material and effective to substantially absorb said infrared light in said predetermined spectral band.

12. The improved apparatus according to claim 1, further including a thermoelectric (Peltier) cooling device beneath said layer of thermal insulating material.

13. The improved apparatus according to claim 1, wherein said thermoptic film is selected from a group consisting of vanadium dioxide (VO$_2$) and vanadium sesquioxide (V$_2$O$_3$).

* * * * *